United States Patent [19]
Franklin et al.

[11] Patent Number: 5,764,158
[45] Date of Patent: Jun. 9, 1998

[54] METER READING DATA TRANSMISSION SYSTEM AND METHOD OF USING SAME

[75] Inventors: Mark Terrance Franklin, San Diego; John Elwood McGregor, III, Encinitas; Robert Wayne Beyer, Long Beach; Robert William Beyer, Costa Mesa, all of Calif.

[73] Assignee: Water Savers, Inc., San Diego, Calif.

[21] Appl. No.: 633,537

[22] Filed: Apr. 17, 1996

Related U.S. Application Data

[63] Continuation-in-part of Ser. No. 560,161, Nov. 20, 1995.

[51] Int. Cl.$^6$ .......................... G08C 23/00; G08C 15/06
[52] U.S. Cl. .................. 340/870.02; 340/870.11; 364/510
[58] Field of Search ............... 340/870.02, 870.03, 340/870.06, 870.11, 870.14; 364/510

[56] References Cited

U.S. PATENT DOCUMENTS

| | | | |
|---|---|---|---|
| 3,656,112 | 4/1972 | Paull | 340/151 |
| 3,705,385 | 12/1972 | Batz . | |
| 3,747,068 | 7/1973 | Bruner et al. . | |
| 3,967,264 | 6/1976 | Whyte et al. . | |
| 4,213,119 | 7/1980 | Ward et al. . | |
| 4,729,106 | 3/1988 | Rush et al. | 364/510 |
| 4,792,946 | 12/1988 | Mayo . | |
| 4,839,642 | 6/1989 | Batz et al. . | |
| 4,885,943 | 12/1989 | Tootell et al. . | |
| 4,888,706 | 12/1989 | Rush et al. | 364/510 |
| 4,940,976 | 7/1990 | Gastouniotis et al. | 340/870.03 |
| 5,056,107 | 10/1991 | Johnson et al. | 340/870.06 |
| 5,280,498 | 1/1994 | Tymes et al. . | |
| 5,369,784 | 11/1994 | Nelson . | |
| 5,383,134 | 1/1995 | Wrzesinski . | |
| 5,388,101 | 2/1995 | Dinkins . | |
| 5,432,507 | 7/1995 | Mussino et al. | 340/870.03 |
| 5,448,230 | 9/1995 | Schanker et al. | 340/870.03 |
| 5,493,287 | 2/1996 | Bane | 340/870.03 |
| 5,553,094 | 9/1996 | Johnson et al. | 340/870.03 |

Primary Examiner—Jeffery Hofsass
Assistant Examiner—Timothy Edwards, Jr.
Attorney, Agent, or Firm—Bernard L. Kleinke; Peter P. Scott

[57] ABSTRACT

The meter reading data transmission system includes a transmission unit having a meter reading transmitter coupled to a meter. The transmission unit further has an associated node for sending wireless meter reading messages. An intermediate transmission unit including a node receives the meter reading messages, and retransmits the messages. The retransmitted messages are received by a remotely located data collection station to enable the meter to be monitored from a distance.

16 Claims, 7 Drawing Sheets

METER READING DATA TRANSMISSION SYSTEM AND METHOD OF USING SAME

CROSS-REFERENCE TO RELATED APPLICATIONS

This patent application is a continuation-in-part patent application of pending U.S. patent application Ser. No. 08/560,161, filed Nov. 20, 1995, and entitled "FLOW METER AND METHOD OF USING SAME."

TECHNICAL FIELD

The present invention relates in general to a meter reading data transmission system. The invention more particularly relates to a meter reading data transmission system which facilitates the remote monitoring of meters, and which may be used according to a novel method.

BACKGROUND ART

The provision of utility such as water, gas, electricity, and the like to a distinct utility user has been monitored typically at the service connection point to the property of the user. This arrangement enabled the utility provider to determine the amount of utility resources provided to the property. For example, a flow meter located at the water service connection point for metering the amount of water supplied to a residence enables the local water utility entity to determine the amount of water used by the residence. As a result, the utility provider is able to charge the utility user for utility resources according to the amount of utility resources provided.

More recently, it has been found desirable to meter the usage of utility resources at multiple locations within a single property which receives the utility resources. This arrangement, known as sub-metering, enables the utility resource usage to be further defined according to the specific way in which the utility resource is used within the property. As described in U.S. patent application Ser. No. 08/560,161, which is incorporated herein by reference as if fully set forth herein, sub-metering has been employed to distinguish the amount of utility resources provided to a particular tenant in multi-family residences, commercial buildings having more than one tenant, or any other facility having a number of unrelated individually billed tenants.

The inventive flow meter and method of U.S. patent application Ser. No. 08/560,161 enabled sub-metering to advance one step further, wherein it was now possible to meter the usage of utility resources at specific locations within each space occupied by a tenant. In this way, it was feasible to monitor precisely the amount of utility resources that were being used by the tenant for certain purposes.

Once obtained, metering information from each individual meter in a sub-metering arrangement must be collected at an easily identifiable central location to facilitate the recordation of the meter information by a utility provider representative. Otherwise, each meter must be physically located by the representative, and the meter information recorded individually. Such a routine would be inconvenient for both the tenant, whose privacy would be unnecessarily invaded, and for the utility provider representative.

By hard wiring the individual meters to a central recording location with appropriate lengths of suitable wiring, the collection of metering information would be enhanced. In this regard, the metering information for each meter could be communicated to the central recording location, thereby avoiding the need for the utility provider representative to locate each meter.

Although the use of wiring to couple the individual meters of the sub-metering arrangement to the central recording location would reduce the inconvenience associated with obtaining meter information from each meter, the installation of the wiring poses significant difficulties. One such difficulty involves the expense of installing wiring. For a large multi-story building with many tenants, the central recording location may be situated hundreds of feet from a meter, resulting in a substantial expense for a sufficient length of wire to extend across this distance. Furthermore, the voltage drop along the wire associated with the large distance may require the use of larger gauge wire, thereby increasing the expense even more.

Another difficulty associated with the use of wire to conduct the meter information to the central recording location arises where the sub-metering arrangement is installed after the walls of the tenant space are in place. The use of wires in such a situation is awkward and time consuming. In this regard, the wires must be positioned behind the existing walls to conceal and protect them.

Openings must be made in the walls to enable the wires to be passed therethrough. Once within the space behind the walls, the wires must be guided to the central recording location. Finally, the openings must be covered and concealed.

Therefore, it would be highly desirable to have a new and improved meter reading data transmission system which enables meter reading data from a group of meters to be accumulated at a central location, and which system is inexpensive. Such a meter reading data transmission system should also be relatively easy to install.

DISCLOSURE OF INVENTION

Therefore, the principal object of the present invention is to provide a new and improved meter reading data transmission system and a method of using it, wherein the system is used to gather meter reading data from a group of meters at a central location, and is inexpensive and relatively easy to install.

Briefly, the above and further objects of the present invention are realized by providing a new and improved meter reading data transmission system for accumulating meter reading data from a group of meters at a central location according to a novel method, said system being inexpensive and relatively easy to install.

The meter reading data transmission system includes a transmission unit having a meter reading transmitter coupled to a meter. The transmission unit further has an associated node for sending wireless meter reading messages. An intermediate transmission unit including a node receives the meter reading messages, and retransmits the messages. The retransmitted messages are received by a remotely located data collection station to enable the meter to be monitored from a distance.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
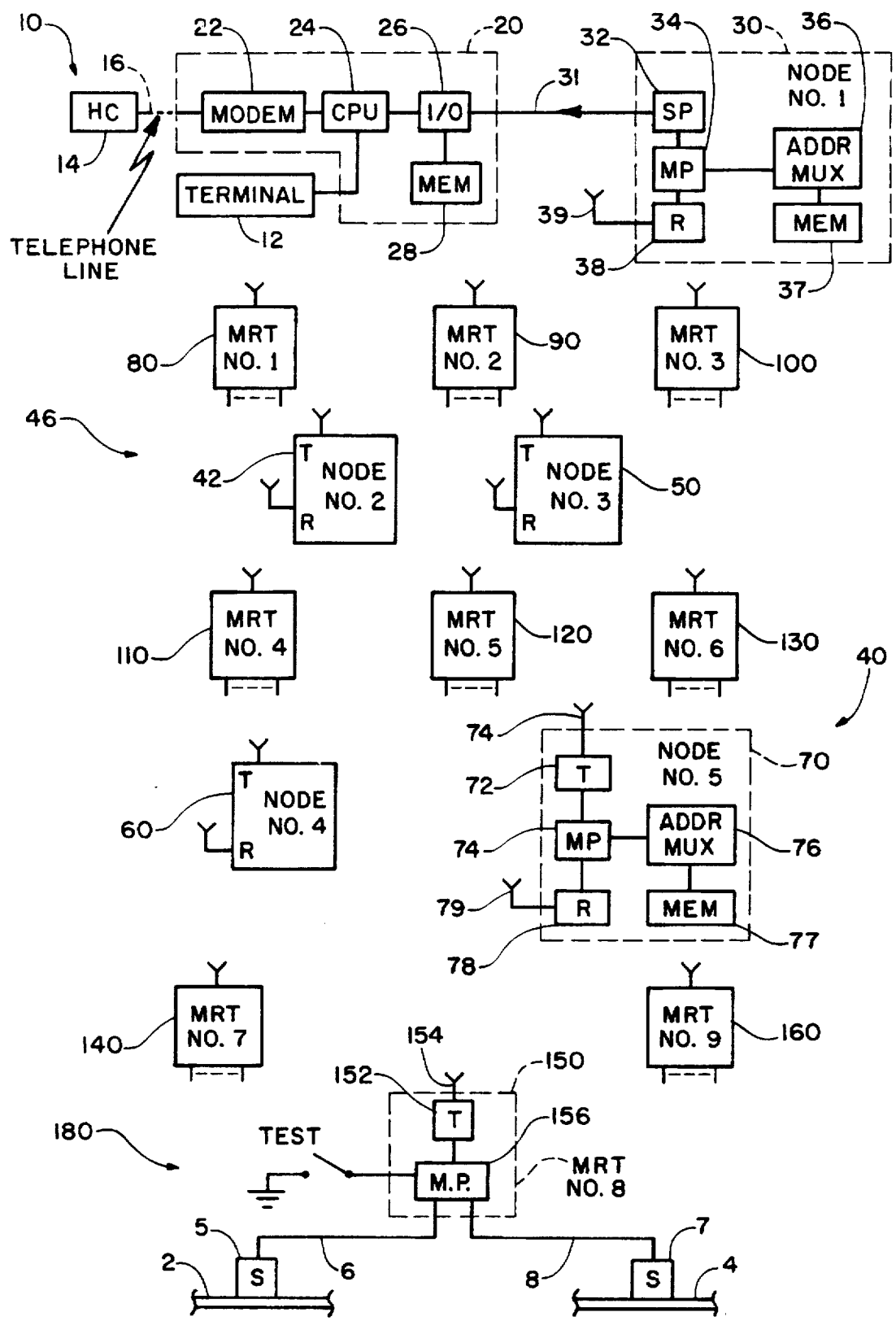
FIG. 1 is a block diagram of a meter reading data transmission system which is constructed in accordance with the present invention.

Referring now to the drawings, and more particularly to FIG. 1 thereof, there is shown a meter reading data transmission system 10, which is constructed in accordance with the present invention. The system 10 enables a group of meters, such as meters 5 and 7, to be monitored remotely in accordance with the method of the present invention.

Although the present invention is described herein in connection with relates to the metering of water through pipes, such as pipes 2 and 4, it will be understood by one skilled in the art that the system 10 could also be used to monitor other utility resources such as gas, electricity and the like.

The system 10 generally comprises a meter reading transmitter/node unit 40 coupled to one or more meters, such as meters 5 and 7, for the wireless transmission of meter reading messages indicative of the measurements made by each of the meters 5 and 7. At least one intermediate meter reading transmitter/node unit, such as unit 46, is spaced apart from the unit 40, but within transmitting distance thereof, to receive and retransmit wirelessly the meter reading messages.

A remotely located data collection station or unit (DCU 20) receives the retransmitted meter reading messages to enable the meters 5 and 7 to be monitored at a single remote location. A terminal 12 enables a user to interact with the DCU 20 for selecting, arranging and presenting meter reading messages in a desired manner. A remote host computer (HC) 14 is coupled to the DCU 20 by a telephone line 16 to facilitate the monitoring and polling of the DCU 20 from another remote location.

In operation, unit 40 periodically transmits meter reading messages pertaining to meters 5 and 7. One or more intermediate units, such as unit 46, receives the meter reading messages transmitted wirelessly by unit 40, and periodically retransmits wirelessly the received meter reading messages. Thus, intermediate unit 46 relays the meter reading messages between the unit 40 and a remote location. The retransmitted meter reading messages are received by the DCU 20 at the remote location, whereby the meters 5 and 7 are monitored from the remote location.

As shown and described herein, the system 10 is representative of a sub-metering system. However, it will be understood by one skilled in the art that the system 10 may also be utilized for metering purposes. In this regard, the system 10 may be used to monitor the supply of a utility resource to a commercial building, residence, or other structure wherein the utility resource is metered only at a single service connection point. For example, the unit 40 may be coupled to the service connection of one residence and unit 46 may be coupled to the service connection of an adjacent residence. Other residences may also be provided with similar intermediate units, wherein the meter reading messages transmitted by unit 40 are received by the unit 46 and retransmitted thereby. The reception and retransmission of the meter reading messages would be repeated by other intermediate units to enable the meter reader messages to be eventually received by the DCU 20.

One or more MRTs, such as MRTs 150 and 160, cooperate with a single node, such as node 70, to define meter reading transmitter/node unit 40. In this regard, node 70 is within the receiving range of MRTs 150 and 160. MRTs 150 and 160 may also be within range of another node, such as node 60, and would define another unit (not shown) which would operate independently of unit 40 to periodically transmit wirelessly the meter reading messages from MRTs 150 and 160.

Considering now the system 10 in greater detail with reference to FIG. 1, the system 10 further includes a group of meter reading transmitters (MRTS) 80, 90, 100, 110, 120, 130, 140, 150 and 160. Each one of the MRTs 80, 90 100, 110, 120, 130, 140, 150 and 160 is coupled directly to at least one meter to generate a meter reading message indicative of metering information for each one of the meters coupled thereto. One ore more MRTs, such as MRTs 150 and 160, cooperate with a single node, such as node 70, to define meter reading transmitter/node unit 40. In this regard, node 70 is within the receiving range of MRTs 150 and 160. MRTs 150 and 160 may also be within range of another node, such as node 60, and would define another unit (not shown) which would operate independently of unit 40 to periodically transmit wirelessly the meter reading messages from MRTs 150 and 160.

As each one of the MRTs 80, 90, 100, 110, 120, 130, 140, 150 and 160 is relatively low powered, the system 10 further includes a group of spaced apart nodes, including nodes 30, 42, 50, 60 and 70, for relaying the meter reading messages transmitted by the MRTs 80, 90, 100, 110, 10, 130, 140, 150 and 160 to the DCU 20. In this regard, the MRTs cooperate with the nodes to define meter reading transmitter/node units, such as meter reading transmitter node unit 40 and intermediate meter reading transmitter/node unit 46.

Intermediate meter reading transmitter/node units, such as unit 46 including node 42 spaced apart from node 70 but within receiving range thereof receive the meter reading messages from distant units, such as unit 40, and retransmit the meter reading messages received therefrom. Node 42 of intermediate unit 46 may cooperate with one or more MRTs, such as MRTs 80, 90, 110 and 120, to transmit meter reading messages pertaining thereto if MRTs 80, 90, 110 and 120 are within receiving range of node 42, in addition to receiving and retransmitting messages from unit 40. However, node 42 may not cooperate with any MRTs, and may only function to receive and retransmit meter reading messages from unit 40. In this way, the meter reading messages may be received and retransmitted to enable the meters 5 and 7 to be monitored from a distant location.

The meter reading transmitter/node units and intermediate meter reading transmitter/node units are arranged in a hierarchy, wherein the intermediate units, such as unit 46, occupy a lower order than the units such as unit 40. Furthermore, no unit has the same order as any other unit, intermediate or otherwise, within the system 10. This hierarchy facilitates the transmission of the meter reading messages from a higher order unit, through the sequentially lower order units, until the messages are received by the lowest ordered unit. The messages are then transmitted from the lowest ordered unit to the DCU 20 for monitoring purposes. In this way, the messages are funneled through the system 10 until the lowest ordered node eventually receives all of the meter reading messages transmitted by MRTs 80, 90, 100, 110, 120, 130, 140, 150 and 160.

As described in greater detail hereinafter, the system 10 is initialized during an initialization period to facilitate the desired hierarchial arrangement. However, the hierarchial arrangement may be reproduced by the careful positioning of the units relative to one another, or by any other similar method or arrangement.

Considering now the MRTs 80, 90, 100, 110, 120, 130, 140, 150 and 160 in greater detail with reference to FIGS. 1 and 2A–2B, only MRT 150 will be described hereinafter in greater detail as all of the MRTs are substantially similar.

MRT 150 includes a microprocessor (MP) 156, such as model PIC16LC16A, coupled to a set of meters including meters 5 and 7 by conductors, such as conductors 6 and 8, to receive metering information signals indicative of the utility resource metered by each meter 5 and 7. Using the meter information signals, the MP 156 generates meter reading messages indicative of the measurements made by each of the meters 5 and 7, and also including identifying information for MRT 150. Coupled to the MP 156 is a transmitter 152 having an antenna 154 for transmitting the meter reading messages.

A power source (not shown) is connected to MRT 150 to supply the required electrical energy for the operation of the MRT. Where the meters 5 and 7 are substantially similar to the flow meters described in U.S. patent application Ser. No. 08/560,161, the power source also facilitates the generation of the meter information signals. The power source preferably comprises one or more battery cells to permit the MRT 150 to be placed in any desired location.

To facilitate initialization of the system 10, a test circuit 180 is coupled to the MP 156 to provide a test signal. A test message is then generated by the MP 156 and transmitted by the transmitter 152 via the antenna 154. As will be described hereinafter in greater detail, the test message is retransmitted by the associated node 70 to facilitate the transmission of a meter reading message to the DCU 20.

Figure 2A:
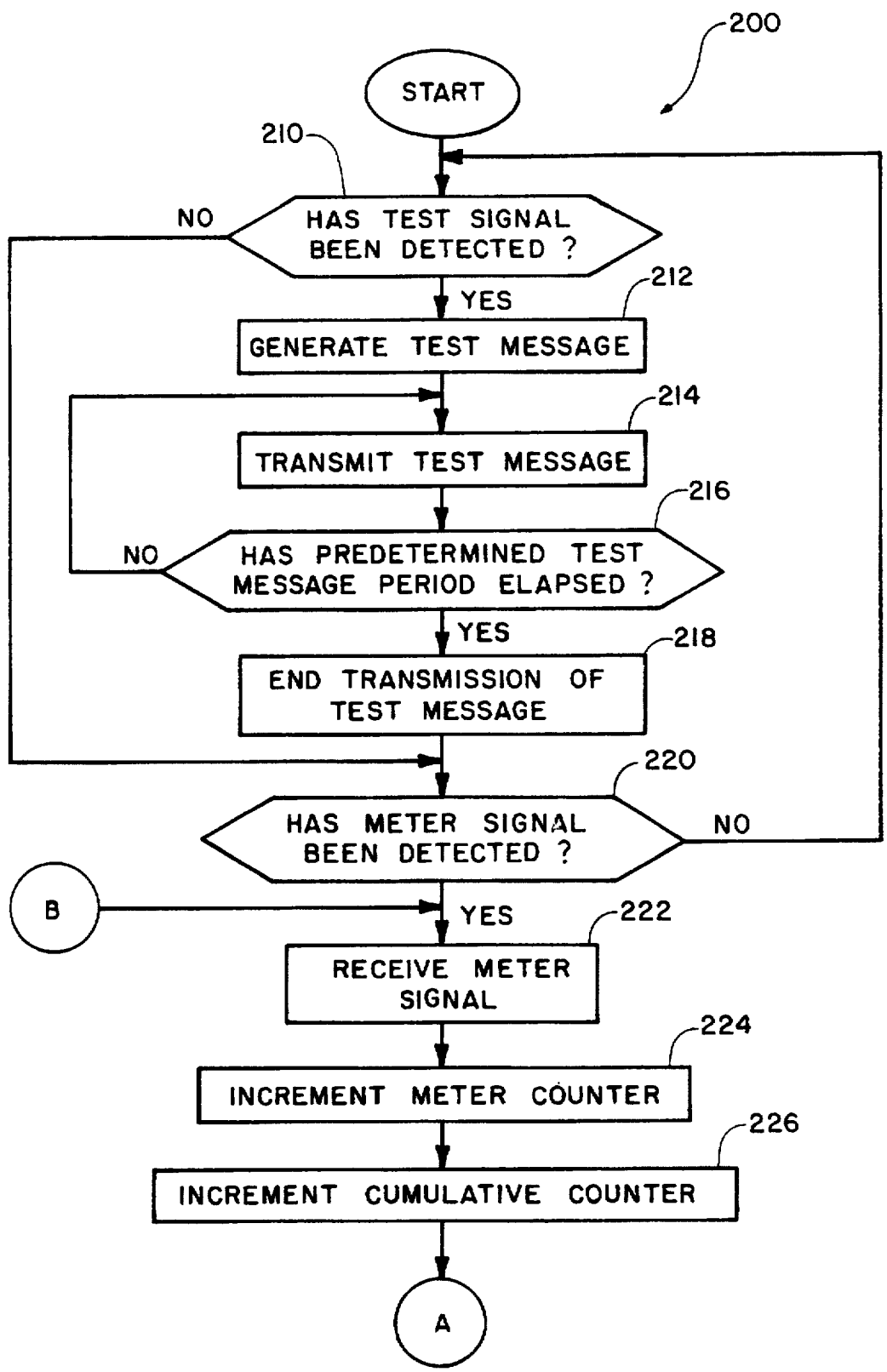
FIG. 2A–2B is a flow chart describing the operation of a meter reading transmitter of the meter reading data transmission system of FIG. 1.
Figure 2B:
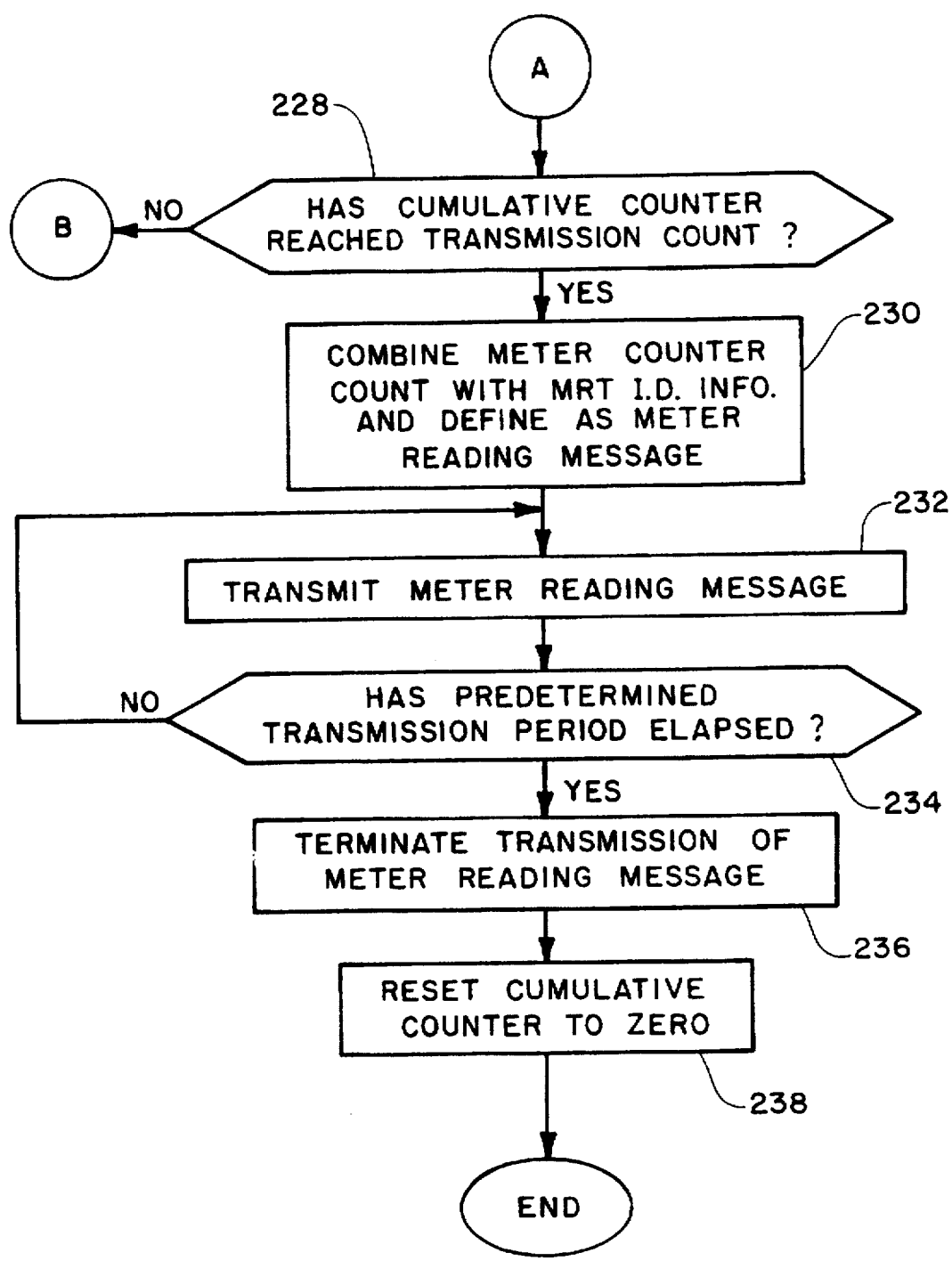
Figure 3A:
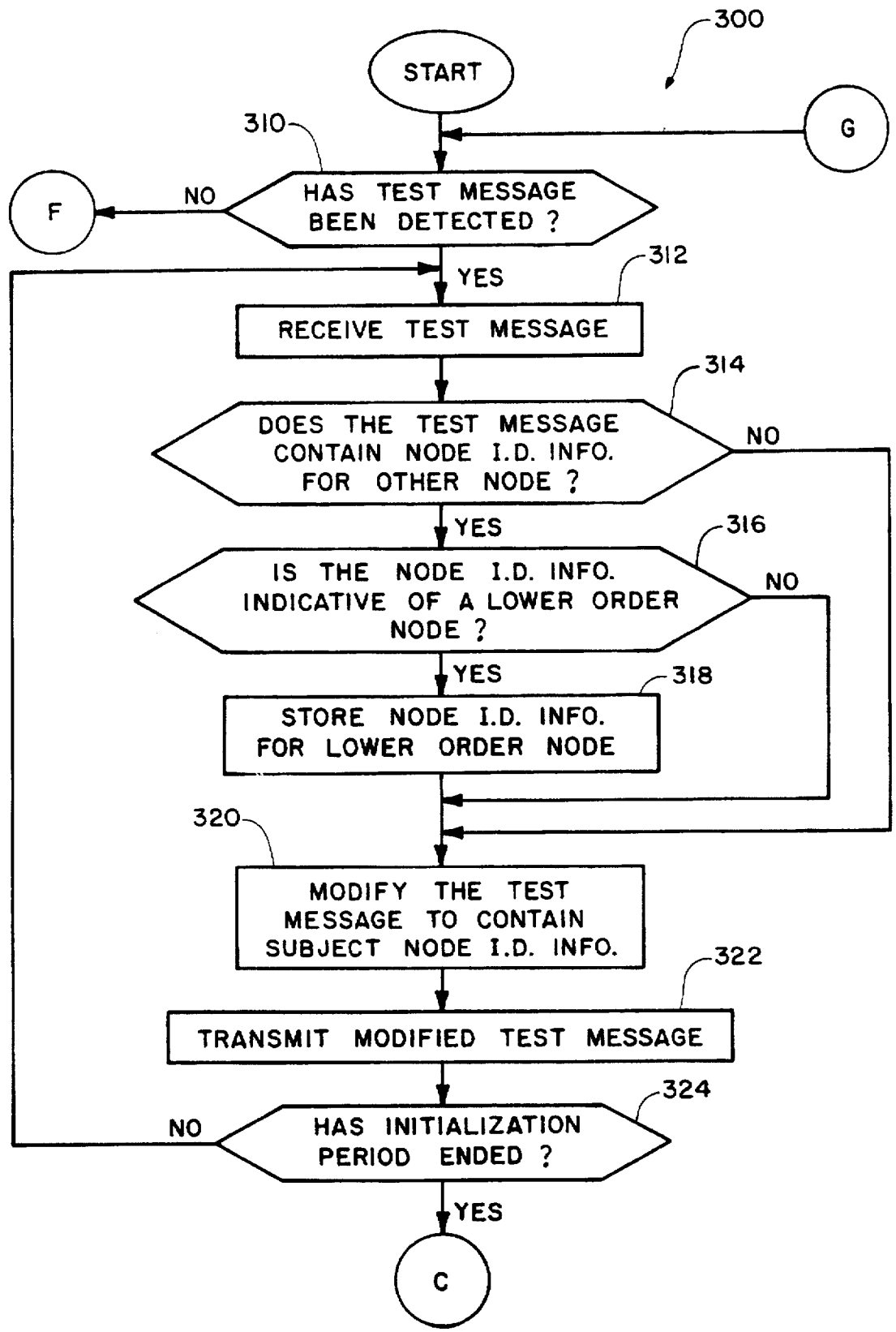
FIG. 3A–3D is a flow chart describing the operation of a node of the meter reading data transmission system of FIG. 1.
Figure 3B:
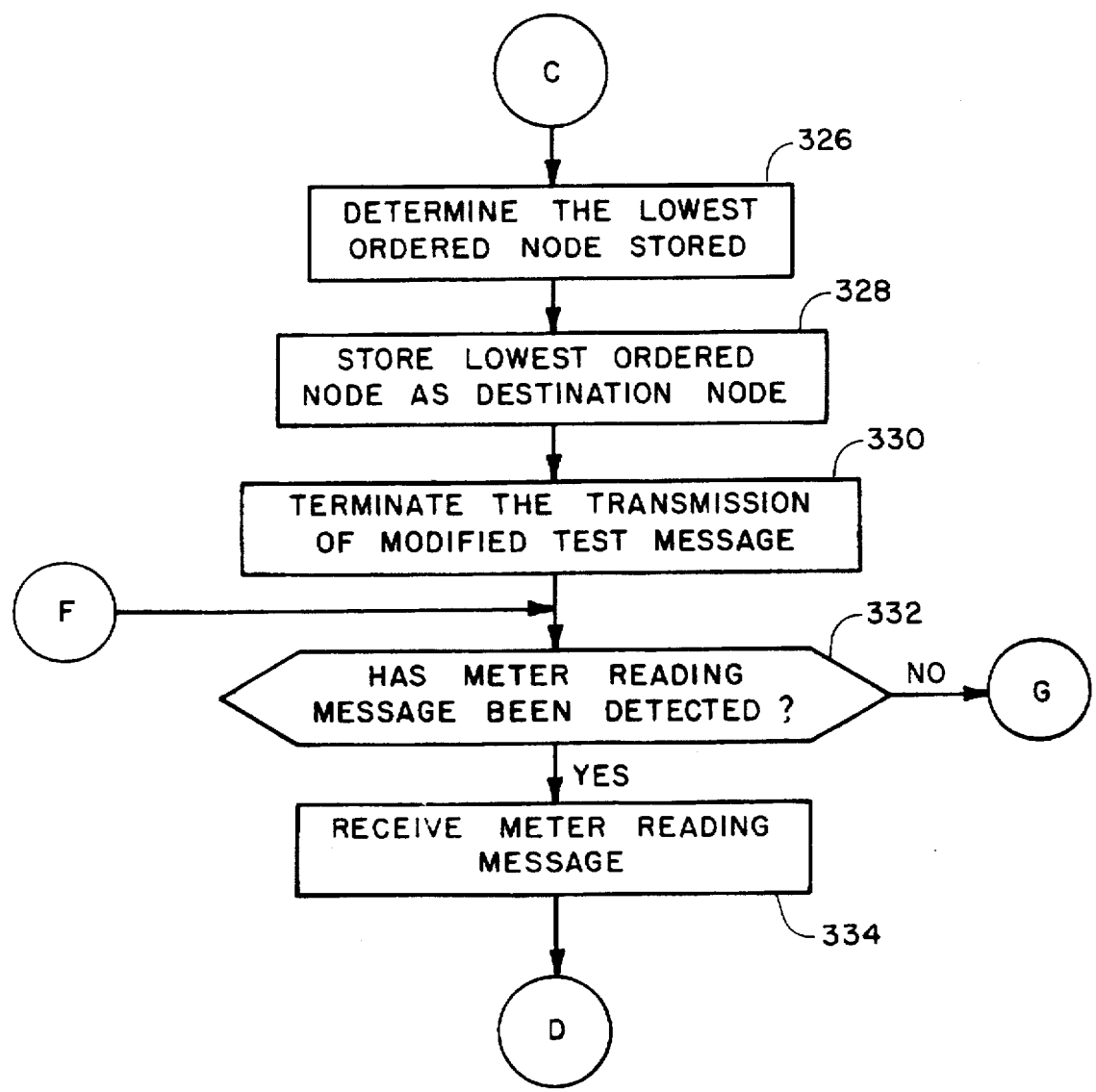
Figure 3C:
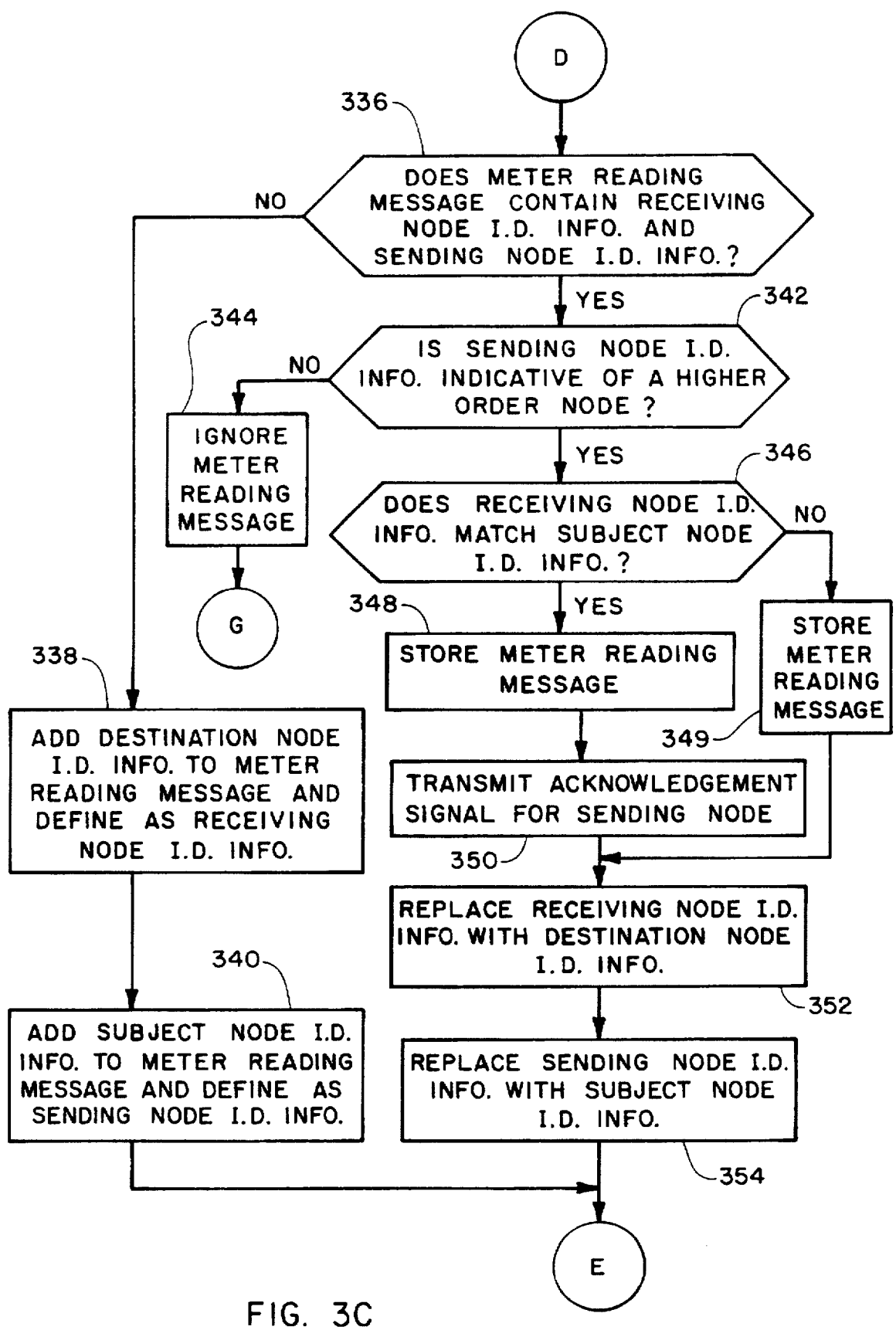
Figure 3D:
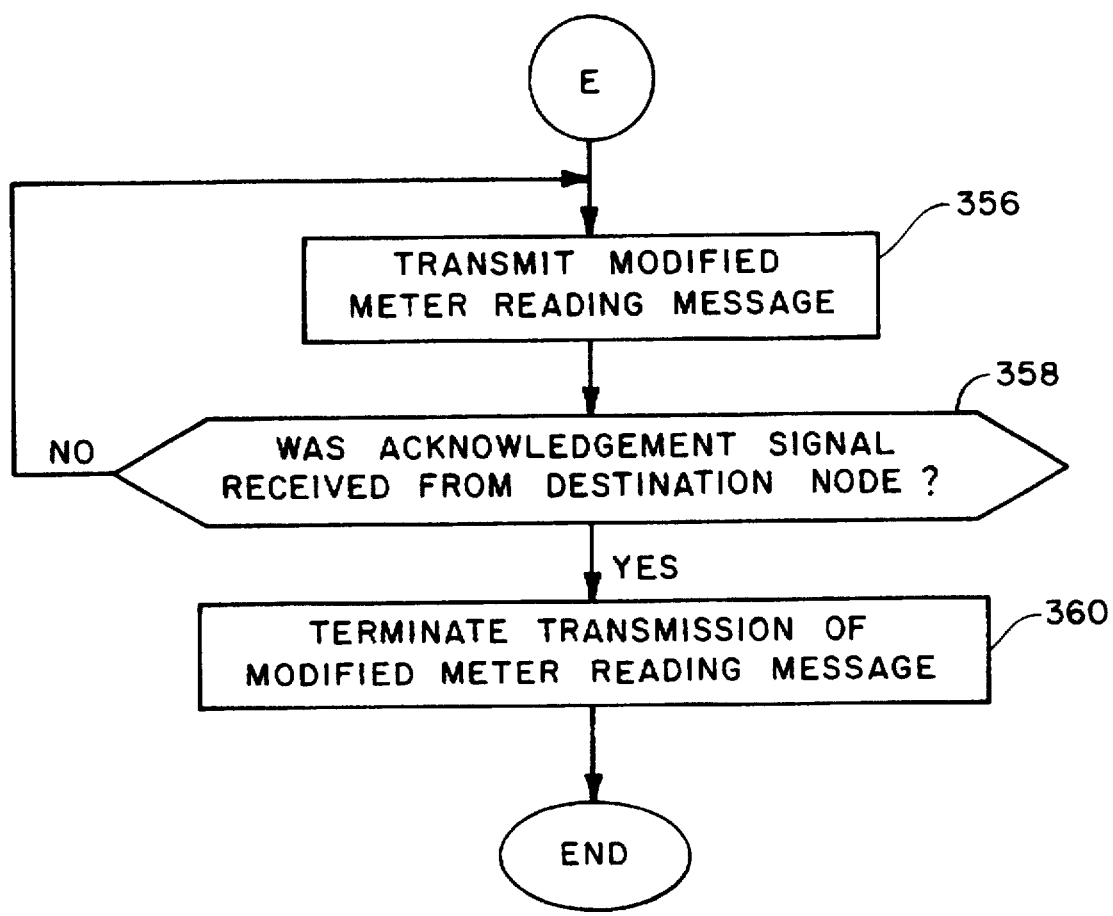

The operation of MRT 150 may be best understood with reference to flow chart 200 (FIGS. 2A–2B). Initially, the detection of a test signal, such as a test signal produced by the test circuit 180, is undertaken at decision box 210 to begin the initialization process. The detection of a test signal causes the MRT to generate a test message at box 212. The test message generated at box 212 is subsequently transmitted at box 214.

The transmission of the test message is repeated continuously until a determination is made at decision box 216 that a predetermined test message period has elapsed. Once it is determined that the predetermined test message period has elapsed, the transmission of the test message is terminated at box 218.

Upon the termination of the transmission of the test message, the detection of a meter signal is determined at decision box 220. The meter signal is indicative of the quantity of the utility resource measured by the meter. Similarly, a determination at decision box 210 that no test signal has been detected causes the detection of a meter signal to be determined at decision box 220. Should it be determined at decision box 220 that no meter signal has been detected, the MRT once again returns to decision box 210 to determine if a test signal has been detected.

When it is determined that a meter signal has been detected at decision box 220, the meter signal is received at box 222, causing a meter counter for the meter generating the meter signal to be incremented at box 224, and also causing an overall cumulative counter to be incremented at box 226. The status of the cumulative counter is compared with a predetermined transmission count at decision box 228 to determine if the cumulative counter count is substantially equal to the transmission count.

Another meter signal is detected at box 222 if the count of the cumulative counter has not yet reached the transmission count. Upon the cumulative counter count reaching the transmission count, the meter counter count for the meter is combined with identification information for the particular MRT which is receiving the meter signal at box 230. The combined meter counter count and MRT identification information is then defined as a meter reading message.

The meter reading message is transmitted at box 232. The transmission of the meter reading message continues until it is determined at decision box 234 that a predetermined transmission period has elapsed. The end of the predetermined transmission period causes the transmission of the meter reading message to be terminated at box 236. The cumulative counter is reset at box 238, and the operation of the MRT ceases until of a test signal, or a meter signal is detected at either box 210 or box 220.

A source code listing for the operation of MRTs 80, 90, 100, 110, 120, 130, 140, 150 and 160 is attached hereto, and is identified as Appendix 1.

Considering now the nodes 30, 42, 50, 60 and 70 with reference to FIGS. 1 and 3A–3D, in greater detail, each one of the nodes 30, 42, 50, 60 and 70 has associated node identification information indicative of the node's position in the hierarchy of system 10. In this regard, node 30 has anode identification information indicative of the lowest ordered node, node 70 has a node identification information indicative of the highest ordered node, and nodes 42, 50 and 60 have node identification information indicative of increasing node order between that of node 30 and of node 70.

Except for the lowest ordered node 30, all of the nodes 30, 42, 50, 60 and 70 are substantially similar and only node 70 will be described hereinafter in greater detail. Node 30 is highly different from the other nodes 42, 50, 60 and 70, and will be discussed separately.

Node 70 includes a receiver 78 having an antenna 79 for receiving meter reading messages and test messages from MRTs. The receiver 78 may also receive test messages and meter reading messages from other nodes, as will be described in greater detail hereinafter.

A microprocessor (MP) 74, such as a model 80C31, coupled to the receiver 78 controls the operation of the node 70 to receive and retransmit test messages and meter reading messages. An address multiplexor (ADDR MUX) 76 and a memory device 77 coupled to the MP74 enable the node 70 to modify the received test messages and meter reading messages to include node identification information for the node 70 and node identification information for a node, such as node 42, to receive the modified meter test messages or meter reading messages which are transmitted by the node 70. A transmitter 72 having an antenna 74 is coupled to the MP74 to enable the modified meter reading messages to be transmitted.

The MP74, in cooperation with the ADDR MUX 70 and memory 77, enables the node 70 to determine if a meter reading message is being received from a higher order node or from a lower order node. If received from a higher order node, the node 70 will retransmit the received meter reading information. However, meter reading information from a lower order node will be ignored and will not be retransmitted by the node 70.

A power source (not shown) is connected to the node 70 to supply electrical energy thereto. As the node 70 can be positioned without regard to the location of the meters 5 and 7, the power source is preferably a typical 120 volt electrical source. Thus, the node 70 should include a plug (not shown) and cord for connecting the node 70 to the 120 volt source. However, other electrical energy sources may also be suitable.

During the initialization period, nodes 42, 50, 60 and 70 receive test messages from MRTs. In addition, they may receive test messages from other nodes, without regard to whether the other nodes are of a higher or lower order. The test messages received from other nodes include node identification information to enable the node receiving the test messages to identify the node which transmitted the test message.

Using the node identification information received, the receiving or subject node determines which of the nodes that is transmitting a test message, and which is received by the subject node, is the lowest ordered node. The node identification information for this lowest ordered node is then stored as a destination node for all transmissions of meter reading messages for the subject node.

Node 30 is substantially similar to nodes 42, 50, 60 and 70, except that node 30 does not retransmit modified test messages or meter reading messages via a transmitter, such as transmitter 72. In this regard, node 30 is representative of the lowest ordered node possible, and receives meter reading messages from higher order nodes only. Thus, it cannot transmit to a lower order node.

Therefore, node 30 is connected directly to the DCU 20 by a conductor 31. Node 30 includes a serial port (SP32) coupled to a microprocessor 34 for transmitting the received meter reading messages directly to the DCU 20.

The operation of the nodes is illustrated in the flow chart 300 of FIGS. 3A–3D. Node 30 does not require initialization. Thus, the initialization steps of boxes 310–330 do not apply to node 30. The remaining steps, however, are applicable to the transmission of meter reading message by node 30.

Initialization of nodes 42, 50, 60 and 70 begins with the detection of a test message transmitted by an MRT, or another node. A determination is made at decision box 310 as to whether such a test message has been detected.

Where a test message is detected, the test message is received at box 312. The test message is analyzed at decision box 314 to determine if it contains node identification information for another node, indicating that the subject node has received a test message from another node rather than directly from an MRT.

A determination that the test message does contain node identification information for another node causes the node identification information to be analyzed at decision box 316 to determine if the node identification information is indicative of a lower order node. Should the node identification information indicate a lower ordered node, the node identification information for the lower ordered node is stored at box 318. The test message is then modified at box 320 to contain node identification information for the subject node before the modified test message is transmitted at box 322.

A determination at decision box 314 that the test message does not include node identification information indicates that the test message was received directly from an MRT. Thus, initialization must continue until a lower ordered node is subsequently detected. The failure to detect node identification information for another node at decision box 314 causes the test message to be modified at box 320.

Where the test message is determined to contain node identification information for another node at box 314 but the node identification information is not indicative of a lower order node, the test message is modified to contain the subject node identification information at box 320 without storing the node identification information at box 318. The modified test message is then transmitted at box 322.

The transmission of the modified test message continues until it is determined that the initialization period has ended at decision box 324. Upon the termination of the initialization period, the stored node identification information is analyzed to determine the lowest ordered node associated with the stored information at box 326.

The lowest ordered node information is stored as destination node information at box 328 to facilitate the transmission of meter reading messages, as described in greater detail hereinafter. After the lowest ordered node identification information has been stored as destination node information at box 328, the transmission of the modified test message is terminated at box 330, before the node determines if a meter reading message has been detected at decision box 332. Where no test message was detected at decision box 310, the node similarly proceeds to determine whether a meter reading message has been detected at box 332.

With regard to node 42, there is no need to determine the destination node identification information as node 30 is the only node having a lower order. Thus, the destination node identification for node 42 may be set initially without the use of test messages.

The detection of a meter reading message at decision box 332 results in the meter reading message 334 being received by the node at box 334. Alternatively, the failure to detect a meter reading message at decision box 332 returns the operation to decision box 310 to determine if a test message has been detected.

A determination is made at decision box 336, following the receipt of the meter reading message at box 334, to determine if the meter reading message contains both receiving node identification information and sending node identification. Where the meter reading message is determined to contain receiving node identification information and sending node identification information, indicative of the message being received from another node, a determination is made at decision box 342 as to whether the sending node identification information is indicative of a higher ordered node than the subject node.

If the sending node identification information is not indicative of a higher ordered node, the meter reading message is ignored as represented by box 342, and the operation returns to decision box 310. However, where the sending node identification information is indicative of a higher ordered node, a determination is made at decision box 346 as to whether the receiving node identification information of the received meter reading message matches the node identification information for the present or subject node. In this regard, a match would indicate that the meter reading message was intended to be received by the subject node.

A determination that the message was intended for the subject node cause the meter reading message to be stored at box 348. An acknowledgement signal is then transmitted at box 350 for enabling the sending node to terminate its transmission of the meter reading message. The receiving node information identification is then replaced with previously stored destination node identification information at box 352.

A determination at decision box 346 that the receiving node identification information does not match the subject node identification information causes the meter reading message to be stored at box 349. The receiving node identification information is then replaced with the destination node identification information at box 352 without an acknowledgement signal being transmitted at box 350.

Once receiving node identification information has been substituted with destination node identification information at box 352, the sending node identification information of the received meter reading message is replaced with node identification information for the subject node at box 354. Thus, the meter reading message has been modified with new "to" and "from" information, wherein the node that is to receive the modified meter reading message from the subject node is now identified as the destination node as determined during the initialization period. Similarly, the subject node information has been incorporated into the meter reading message to identify the retransmitted meter reading message as coming from the subject node.

A determination at decision box 336 that the received meter reading message does not contain receiving node identification and sending node identification information indicates that the meter reading message was received directly from an MRT, and appropriate sending node identification information and receiving node information must be added to the meter reading message. In this regard, the stored destination node identification information is added to the meter reading message and defined as receiving node identification information at box 338. The subject node identification information is also added to the meter reading message, and defined as sending node identification information, at box 340 to complete the sending and receiving node information.

The modified meter reading message from either box 354 or from box 340 is then transmitted at box 356. The transmission of the modified meter reading message is continued until an acknowledgement signal is received from the receiving or destination node at decision box 358. Upon the detection of the acknowledgement signal from the destination node, the transmission of the modified meter reading message is terminated at box 360, and the operation of the node terminates until the detection of a new test message or a new meter reading message.

A source code listing for the operation of the nodes 30, 42, 50, 60 and 70 is attached hereto, and is identified as Appendix 2.

Considering now the DCU 20 in greater detail with reference to FIG. 1, the DCU 20 includes an input/output (I/O) device 26 for enabling the DCU 20 to communicate with the node 30 via the serial port (SP) 32. The DCU 20 further includes a central processing unit (CPU) 24 for controlling the operation of the DCU 20 to enable all of the meters, such as meters 5 and 7, to be remotely monitored. A memory device 28 is coupled to the I/O 26 and the CPU 24 to facilitate the monitoring.

User interaction with the CPU 24 is facilitated with the terminal 12. A modem device 22 coupled to the CPU 24 facilitates remote access to the monitoring information obtained by the DCU 20 via telephone lines 16.

The DCU 20 is preferably a DOS based computer, and facilitates the calculation of the usage of the utility resource metered using appropriate calculation methods. A source code listing for the operation of the DCU 20 in monitoring the meter reading messages received is attached hereto, and is identified as Appendix 3. Also attached herewith, and identified as Appendix 4, is a source code listing for a basic utilities program for interacting with the DCU 20.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

APPENDIX 1

```
LIST    P=16C71,    F=INHX8M org         0x0C
master      res     3
temp        res     1 meter1              res     4
meter2              res     4
meter3              res     4
meter4              res     4
meter5              res     4 xmitdata    res     1
scnt        res     1
pcnt        res     1
chksum              res     1

INDIR       equ     0
TMR0   equ  1h
PC     equ  2h
STATUS equ  3h
FSR    equ  4h
PORTA       equ     5h
PORTB       equ     6h
PORTC       equ     7h
PCLATH equ  0AH
INTCON equ  0BH TRISA  equ  05H
TRISB  equ  06H C      equ  0h
DC     equ  1h
Z      equ  2h
PD     equ  3h
TO     equ  4h
RP0    equ  5h
RP1    equ  6h
IRP    equ  7h PS0    equ  0
PS1    equ  1
PS2    equ  2
```

1-1

APPENDIX 1

```
        PSA     equ    3
        TOSE    equ    4
        TOCS    equ    5
        INTEDG         equ    6
        RBPU    equ    7

GIE     equ    7h
        TOIE    equ    5h
        INTE    equ    4h
        RBIE    equ    3h
        TOIF    equ    2h
        INTF    equ    1h
        RBIF    equ    0 org     0
        call    clrram
        call    init
        goto    loop org     4
        btfsc   INTCON,RBIF
        goto    havesw
        bcf     INTCON,TOIF
        bcf     INTCON,INTF
        retfie loop
        btfsc   master,3
        goto    loop1
        sleep
        goto    loop loop1
        call    clrmaster
        call    xmit
        goto    loop
havesw
        movf    PORTB,w call    delay2x
        call    delay2x
        call    delay2x
        call    delay2x movf    PORTB,w
```

1-2

APPENDIX 1

```
        movwf   temp
        bsf     PORTB,2 btfss   temp,4
        goto    s78
        btfss   temp,5
        goto    s56
        btfss   temp,6
        goto    s34
        btfss   temp,7
        goto    s12 clrf    PORTB
        nop
        movf    PORTB,w
        bcf     INTCON,RBIF
        retfie s12
        btfss   PORTB,7
        goto    s2
        call    incmeter1
        goto    exit
s2
        call    incmeter2
        goto    exit s34
        btfss   PORTB,6
        goto    s4
        call    incmeter3
        goto    exit
s4
        call    incmeter4
        goto    exit s56
        btfss   PORTB,5
        goto    s6
        call    incmeter5
        goto    exit
s6
        call    incmeter6
        goto    exit
```

1-3

APPENDIX 1

```
s78
        btfss   PORTB,4
        goto    s8
        call    incmeter7
        goto    exit
s8
        clrf    PORTB
        bsf     master,3
        bcf     INTCON,RBIF
        retfie exit
        clrf    PORTB
        call    incmaster
        movf    PORTB,w
        bcf     INTCON,RBIF
        retfie delay2x
        movlw   .256-40
delay2xa
        addlw   .1
        btfss   STATUS,Z
        goto    delay2xa
        return init
        bsf     STATUS,RP0
        movlw   0
        movwf   TRISA
        movlw   B'11110001'
        movwf   TRISB
        bcf     TMR0,RBPU
        bcf     STATUS,RP0 clrf    PORTB
        clrf    PORTA bcf     INTCON,INTE
        bcf     INTCON,TOIE bcf     INTCON,INTF
        bcf     INTCON,TOIF movf    PORTB,w
```

1-4

APPENDIX 1

```
        bcf     INTCON,RBIF
        bsf     INTCON,RBIE
        retfie incmaster
        incfsz  master,1
        return
        incfsz  master+1,1
        return
        incf    master+2,1
        return incmeter1
        incfsz  meter1,1
        return
        incfsz  meter1+1,1
        return
        incfsz  meter1+2,1
        return
        incf    meter1+3,1
        return incmeter2
        incfsz  meter2,1
        return
        incfsz  meter2+1,1
        return
        incfsz  meter2+2,1
        return
        incf    meter2+3,1
        return incmeter3
        incfsz  meter3,1
        return
        incfsz  meter3+1,1
        return
        incfsz  meter3+2,1
        return
        incf    meter3+3,1
        return incmeter4
        incfsz  meter4,1
        return
```

1-5

APPENDIX 1

```
        incfsz  meter4+1,1
        return
        incfsz  meter4+2,1
        return
        incf    meter4+3,1
        return incmeter5
        incfsz  meter5,1
        return
        incfsz  meter5+1,1
        return
        incfsz  meter5+2,1
        return
        incf    meter5+3,1
        return incmeter6
        incfsz  meter6,1
        return
        incfsz  meter6+1,1
        return
        incfsz  meter6+2,1
        return
        incf    meter6+3,1
        return incmeter7
        incfsz  meter7,1
        return
        incfsz  meter7+1,1
        return
        incfsz  meter7+2,1
        return
        incf    meter7+3,1
        return clrmaster
        clrf    master
        clrf    master+1
        clrf    master+2
        return clrram
        call    clrmaster
```

APPENDIX 1

```
        movlw .16
        movwf   temp
clr1
        movf  temp,0
        movwf   FSR
        movlw .0
        movwf   INDIR
        incf  temp,1
        movlw .48
        subwf temp,0
        btfss STATUS,C
        goto  clr1
        return pause
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
```

1-7

APPENDIX 1

```
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        call    wait
        return wait
        movlw   .255
        movwf   pcnt
wait1
        call    delay2x
        decfsz  pcnt
        goto    wait1
        return sendchar
        movwf   xmitdata
        movlw   8
        movwf   scnt
send1
        movlw   .2
        xorwf   PORTA,1
        call    delay2x
        rlf     xmitdata,1
        btfss   STATUS,C
        goto    send2
        movlw   .2
        xorwf   PORTA,1
send2
        call    delay2x
        decfsz  scnt,1
        goto    send1
```

1-8

APPENDIX 1

```
        return xmit
        bcf     INTCON,GIE
        btfsc   INTCON,GIE
        goto    xmit movlw 0
        movwf   chksum movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFF
        call    sendchar
        movlw 0xFE
        call    sendchar
```

1-9

APPENDIX 1

```
movlw   0
call    sendchar movlw   0
call    sendchar
movlw   0
call    sendchar
movlw   0
call    sendchar
movlw   0
call    sendchar movlw   0
call    sendchar
movlw   0
call    sendchar
movlw   0
call    sendchar
movlw   0
call    sendchar call    serial1
addwf   chksum,1
call    sendchar
call    serial2
addwf   chksum,1
call    sendchar
call    serial3
addwf   chksum,1
call    sendchar
call    serial4
addwf   chksum,1
call    sendchar movf    meter1,0
addwf   chksum,1
call    sendchar
movf    meter1+1,0
addwf   chksum,1
call    sendchar
movf    meter1+2,0
addwf   chksum,1
call    sendchar
movf    meter1+3,0
addwf   chksum,1
```

1-10

APPENDIX 1

```
call    sendchar movf    meter2,0
addwf   chksum,1
call    sendchar
movf    meter2+1,0
addwf   chksum,1
call    sendchar
movf    meter2+2,0
addwf   chksum,1
call    sendchar
movf    meter2+3,0
addwf   chksum,1
call    sendchar movf    meter3,0
addwf   chksum,1
call    sendchar
movf    meter3+1,0
addwf   chksum,1
call    sendchar
movf    meter3+2,0
addwf   chksum,1
call    sendchar
movf    meter3+3,0
addwf   chksum,1
call    sendchar movf    meter4,0
addwf   chksum,1
call    sendchar
movf    meter4+1,0
addwf   chksum,1
call    sendchar
movf    meter4+2,0
addwf   chksum,1
call    sendchar
movf    meter4+3,0
addwf   chksum,1
call    sendchar movf    meter5,0
addwf   chksum,1
call    sendchar
movf    meter5+1,0
```

1-11

APPENDIX 1

```
        addwf   chksum,1
        call    sendchar
        movf    meter5+2,0
        addwf   chksum,1
        call    sendchar
        movf    meter5+3,0
        addwf   chksum,1
        call    sendchar movf    meter6,0
        addwf   chksum,1
        call    sendchar
        movf    meter6+1,0
        addwf   chksum,1
        call    sendchar
        movf    meter6+2,0
        addwf   chksum,1
        call    sendchar
        movf    meter6+3,0
        addwf   chksum,1
        call    sendchar movf    meter7,0
        addwf   chksum,1
        call    sendchar
        movf    meter7+1,0
        addwf   chksum,1
        call    sendchar
        movf    meter7+2,0
        addwf   chksum,1
        call    sendchar
        movf    meter7+3,0
        addwf   chksum,1
        call    sendchar
        movf    chksum,0
        call    sendchar
xmit5
        bcf     PORTA,1
        bsf     INTCON,GIE return serial1
        retlw   0x12
serial2
```

1-12

APPENDIX 1

```
        retlw   0x34
serial3
        retlw   0x56
serial4
        retlw   0xFE end
```

1-13

APPENDIX 2

```
$MOD51
$TITLE(Node Software DK01)
$DATE(01/15/96)

$pagewidth(96)

eot        equ    4
cr         equ    0dh
lf         equ    0ah porg       equ    0h

DSEG

ORG  08h
meter1:           ds    4
meter2:           ds    4
meter3:           ds    4
meter4:           ds    4
meter5:           ds    4
destaddr:  ds     4 flg1:      ds     1
rxflag     bit    flg1.0
xmitflag   bit    flg1.1
rxstate    bit    flg1.2
oldstate   bit    flg1.3
ledblink   bit    flg1.4 mtimer:           ds    4
lpxserial: ds     4
curtick:   ds     1
numchars:  ds     1
msgptr:           ds    2
scnt:      ds     1
sdata:     ds     1
rxbuf:     ds     43
chksum:           ds    1
packettype: ds    1
xmitdata:  ds     1
random:           ds    2
retry:     ds     1
origaddr:  ds     4
serialbuf: ds     4
stack:     ds     24
```

2-1

APPENDIX 2

```
s1     bit    p1.0
s2     bit    p1.1
s3     bit    p1.2
s4     bit    p1.3
s5     bit    p1.4
s6     bit    p1.5
s7     bit    p1.6
s8     bit    p1.7 rx     bit    p3.0
tx     bit    p3.1
rxd    bit    p3.2
swin   bit    p3.3
txd    bit    p3.4
te     bit    p3.5
led    bit    p3.6

CSEG

ORG    porg
       ajmp   init

ORG    porg+3
       ljmp   rxdint

ORG    porg+23h serint:
       push   acc
       push   psw
       push   dph
       push   dpl jb     ti,serint07 jnb    ri,serint06 mov    a,sbuf
       mov    r2,a
       clr    ri
       inc    r6
```

2-2

APPENDIX 2

```
            cjne    r6,#serialbuf+4,serint4
            mov     r6,#serialbuf
serint4:
            mov     a,r0
            push    acc mov     a,r6
            mov     r0,a
            mov     a,r2
            mov     @r0,a pop     acc
            mov     r0,a
serint06:
            pop     dpl
            pop     dph
            pop     psw
            pop     acc
            reti
serint07:
            clr     ti
            clr     xmitflag
            jmp     serint06 rxdint:
            push    acc
            push    psw
            push    dph
            push    dpl
            pop     dpl
            pop     dph
            pop     psw
            pop     acc
            reti init:
            mov     ie,#0 mov     scon,#01010010b
```

2-3

APPENDIX 2

```
        mov     tmod,#00100001b
        mov     tcon,#11010011b mov     th1,#0FEh clr     xmitflag
        setb    tr1 mov     sp,#stack
        mov     psw,#0 mov     a,#0
        mov     r0,#127
init1:
        mov     @r0,a
        djnz    r0,init1 clr     ri
        clr     ti
        mov     ie,#10010000b clr     txd mov     destaddr,#0ffh
        mov     destaddr+1,#0ffh
        mov     destaddr+2,#0ffh
        mov     destaddr+3,#0ffh
        setb    ledblink mov     dptr,#msg4
        call    prmsg init2:
        call    pause1
        call    pause1
        call    pause1
```

2-4

APPENDIX 2

```
        mov     dptr,#msg28
        call    prmsg
        call    waitxmit
        call    xmit3
        call    getpacket
        jc      init2
        call    savedata
        call    prdata clr     c
        mov     a,packettype
        subb    a,#4
        jnz     init2 clr     ledblink
        setb    led mov     dptr,#msg27
        call    prmsg
        call    checkless
        jc      nowrite mov     dptr,#msg32
        call    prmsg mov     a,rxbuf+1
        mov     destaddr+3,a
        mov     a,rxbuf+2
        mov     destaddr+2,a
        mov     a,rxbuf+3
        mov     destaddr+1,a
        mov     a,rxbuf+4
        mov     destaddr,a
nowrite:

main:
        call    getpacket
        jc      main
        call    savedata
        mov     a,packettype
        jz      relaydata
```

2-5

APPENDIX 2

```
        mov     a,packettype
        clr     c
        subb    a,#3
        jz      send3
        call    prdata
        jmp     main
send3:
        call    prdata
        call    pause1
        call    pause1
        call    pause1
        call    waitxmit
        call    xmit4
        jmp     main relaydata:
        call    prdata
resend:
        clr     led
        call    txdelay
        call    waitxmit
        call    xmit1
        setb    led call    getpacket
        jc      resend
        call    savedata
        call    prdata clr     c
        mov     a,packettype
        subb    a,#2
        jnz     resend jmp     main atimeout:
        mov     dptr,#msg31
        call    prmsg
        setb    c
        ret
```

APPENDIX 2

```
getpacket:
        mov     mtimer,#0
        mov     mtimer+1,#0
        mov     mtimer+2,#0
        mov     mtimer+3,#0 mov     dptr,#msg0
        call    prmsg mov     r5,#42
        mov     r0,#rxbuf
        mov     a,#0
gp1:
        mov     @r0,a
        inc     r0
        djnz    r5,gp1 mov     numchars,#0
        mov     r1,#rxbuf
        mov     scnt,#8
        mov     sdata,#0
        clr     rxflag
        call    waitlow call    waittogglea
        jc      atimeout
        call    waittogglea
        jc      atimeout
        call    waittogglea
        jc      atimeout
        call    waittogglea
        jc      atimeout
        call    waittogglea
        jc      atimeout
        call    waittoggle call    waittogglea
        jc      atimeout
        call    waittogglea
        jc      atimeout
        call    waittogglea
        jc      atimeout
        call    waittogglea
        jc      atimeout
        call    waittogglea
```

APPENDIX 2

```
        jc      atimeout
        call    waittogglea
        jc      atimeout jmp     main3a
nextbit:
        call    waittoggle
        jc      timeout
main3a:
        setb    te
        call    delay4
        clr     te
        jb      rxd,main2
        clr     oldstate
        jmp     main7
main2:
        setb    oldstate
main7:
        call    delay4
        setb    te
        call    delay4
        clr     te jb      oldstate,main8
        jmp     main9 main8:
        jb      rxd,main5
        jmp     main10 main9:
        jb      rxd,main10
        jmp     main5 main10:
        jnb     rxflag,nextbit
        setb    c
        jmp     main6
main5:
        setb    rxflag
        clr     c
main6:
        mov     a,sdata
        rlc     a
        mov     sdata,a
```

2-8

APPENDIX 2

```
        djnz    scnt,nextbit
        mov     scnt,#8
        mov     @r1,sdata
        inc     numchars
        inc     r1
        cjne    r1,#rxbuf+42,nextbit timeout:
        mov     a,numchars
        cjne    a,#2Ah,main15 call    dochksum
        jnc     main16
        mov     dptr,#msg30
        call    prmsg
        jmp     getpacket
main16:
        ret
main15:
        mov     dptr,#msg29
        call    prmsg
        jmp     getpacket waittogglea:
        jb      rxd,wt2a
wt1a:
        call    tick
        mov     a,mtimer+2
        clr     c
        subb    a,#20
        jz      wt3a
        jnb     rxd,wt1a
        clr     c
        ret
wt2a:
        call    tick
        mov     a,mtimer+2
        clr     c
        subb    a,#20
        jz      wt3a
        jb      rxd,wt2a
        clr     c
```

2-9

APPENDIX 2

```
        ret
wt3a:
        setb    c
        ret decrandom:
        clr     c
        mov     a,random
        subb    a,#1
        mov     random,a mov     a,random+1
        subb    a,#0
        mov     random+1,a
        ret tick:
        clr     c
        mov     a,mtimer
        add     a,#1
        mov     mtimer,a mov     a,mtimer+1
        addc    a,#0
        mov     mtimer+1,a mov     a,mtimer+2
        addc    a,#0
        mov     mtimer+2,a mov     a,mtimer+3
        add     a,#0
        mov     mtimer+3,a jnb     ledblink,noled
        jnb     mtimer+1.4,tick1
        clr     led
        ret
tick1:
        setb    led
noled:
        ret
```

2-10

APPENDIX 2

```
waitxmit:
        mov     retry,#0ffh
wx1:
        djnz    retry,wx4
        mov     dptr,#serialnum
        mov     a,#3
        movc    a,@a+dptr
        xrl     a,#055h
        mov     b,#07
        mul     ab
        mov     random,a
        mov     random+1,b mov     dptr,#serialnum
        mov     a,#1
        movc    a,@a+dptr
        xrl     a,#0AAh
        mov     b,#13
        mul     ab
        addc    a,random
        mov     random,a
        mov     a,b
        addc    a,random+1
        anl     a,#07
        mov     random+1,a
wx2:
        call    decrandom
        call    delay4x
        jb      rxd,wx1 mov     a,random
        jnz     wx2
        mov     a,random+1
        jnz     wx2
wx4:
        ret checkless:
        mov     r3,destaddr+3
        mov     r4,destaddr+2
        mov     r5,destaddr+1
```

APPENDIX 2

```
        mov     r7,destaddr clr     c
        mov     a,rxbuf+1
        subb    a,r3
        jc      ck1
        jnz     ck2 clr     c
        mov     a,rxbuf+2
        subb    a,r4
        jc      ck1
        jnz     ck2 clr     c
        mov     a,rxbuf+3
        subb    a,r5
        jc      ck1
        jnz     ck2 clr     c
        mov     a,rxbuf+4
        subb    a,r7
        jc      ck1
        jnz     ck2 ck1:
        clr     c
        ret
ck2:
        setb    c
        ret org     0F00h serialnum:  db   10,0,0,0 end
```

2-12

APPENDIX 3

```c
// Version .00 (03/20/96) - Coding started include <stdio.h>
include <string.h> include "defs.h"
include "af.h"            // externs for asm stuff
include "proto.h"         // function protos unsigned char digits[] = {"0123456789ABCDEF"};  // for jprintf()
unsigned int doserr;       // for dos file stuff //*****************************************************************
//*           global variables                *
//***************************************************************** unsigned int    done;              // exit flag
unsigned int    apticks[3];        // ticks for receive timer
short int       ttimer;            // exit timer
unsigned int    state;

unsigned char   *msgptr;           // Message Pointer
unsigned char   command[256];      // Command line input and temp buffer
unsigned int    rxptr;             // Rx char pointer
unsigned char   user_password[20]  = "uuu";
unsigned char   super_password[20] = "sss";
unsigned char   sysop_password[20] = "jjy";
unsigned int    wticks[3];         // ticks for wait //*****************************************************************
//*           data variables                  *
//***************************************************************** unsigned long far    lpxid[DBSIZE];      // lpx transmitter id
unsigned char far    meter[DBSIZE];      // meter number
unsigned long far    counts[DBSIZE];     // meter counts
unsigned long far    gallons[DBSIZE];    // gallons
unsigned char far    pipe[DBSIZE];       // pipe size
unsigned int far     apt[DBSIZE];        // apartement number unsigned char Home[]       =    "\x1B[2J\x1B[1;1H";
unsigned char Login[]      =    "\n\rEnter password -> ";
unsigned char InvalidPort[] =   "\n\rInvalid entry - Press any key to continue.";
unsigned char tempstr[]    =    " ";
```

3-1

APPENDIX 3

```
// ******************************************************************
// *                    main                           *
// ******************************************************************
void main(int argc, char *argv[])
{
        int i,j;

TimerInit();
        timer(apticks);

novideo('1');

cominit1( 9600, 2, 11, 0xF7, 0x2F8 );      // COM2 IRQ3
        cominit2( 9600, 3, 13, 0xDF, 0x3E8 );      // COM3 IRQ5
        cominit3( 9600, 4, 12, 0xEF, 0x2E8 );      // COM4 IRQ4 cls(0);
        done = 0;
        state = 0;
        rxptr=0;

if ( --argc )           /* enter command line input mode if any args */
          {
                jtolower( *++argv );
                if ( *(*argv) == 'm' )
                        modem_terminal();

}

// ttimer = TimerStart( Msec2Tics((unsigned long)500l), exit_tout, 0l );

while( !done )
                {
                if( elapsed1000(apticks) >= 55l )    /* tick the 'active' timer system */
                        {
                        timer(apticks);              // set to delay one tick
                        TimerServer();               // tick the timers
                        } switch(state)
                        {
                        case 0:    /******** Initial State *********/
                                msgptr = Home;
                                state = 1;
```

3-2

APPENDIX 3

```
                break;

case 1:    /*********** Clear the screen *****/
           if ( chkcom3() )
                    cputc3( *msgptr++ );
           if ( !*msgptr )
                    {
                    msgptr = Login;
                    state = 3;
                    }
           break;

case 3:    /*********** Enter Password *****/
           if ( chkcom3() )
                    cputc3( *msgptr++ );
           if ( !*msgptr )
                    {
                    while( inqcnt3 )
                            getcom3();     // flush buffer
                    state=4;
                    command[0] = 0;
                    command[1] = 0;
                    command[2] = 0;
                    }
           break;

case 4:    /******** Wait for password ******/
           if ( GetPassword() )
                    {
                    if( !jstrcmp(command,user_password) )
                            {
                            user_menu();
                            flush();
                            state = 10;
                            }
                    if( !jstrcmp(command,super_password) )
                            {
                            super_menu();
                            flush();
                            state = 40;
                            }
                    if( !jstrcmp(command,sysop_password) )
                            {
                            super_menu();
                            flush();
```

3-3

APPENDIX 3

```
                        state = 80;
                        }
                if( state == 4 )
                        {
                        jstrcpy(command,"\n\rIncorrect password\n\r");
                        msgptr = command;
                        state = 1;
                        }
                }
        break;

//***********************************************************
//*      User Commands                    *
//*********************************************************** case 10:   /***** User Commands ****/
        if ( GetCommand() )
                {
                if( command[0] == '2' )
                        state = 0;
                else
                        state=11;
                }
        break;

case 11:   /******* Invalid command ******/
        sputc3(InvalidPort);
        state=12;
        flush();
        break;

case 12:        // Wait for key
        if( inqcnt3 )
                {
                flush();
                user_menu();
                state=10;
                }
        break;

//***********************************************************
//*      Supervisor Commands              *
//*********************************************************** case 40:   /***** Supervisor Commands ****/
```

3-4

APPENDIX 3

```
        if ( GetCommand() )
            {
                if( command[0] == '3' )           // logoff?
                    state = 0;
                else
                    state=41;
            }
        break;

case 41:    /******** Invalid command ******/
        sputc3(InvalidPort);
        state=42;
        flush();
        break;

case 42:        // Wait for key
        if( inqcnt3 )
            {
                super_menu();
                flush();
                state=40;
            }
        break;

//***********************************************************
//*          Sysop Commands                      *
//*********************************************************** case 80:    /****** Sysop Commands ****/
        if ( GetCommand() )
            {
                if( command[0] == 27 )            // logoff?
                    state = 0;
                else
                    state=81;
            }
        break;

case 81:    /******** Invalid command ******/
        sputc3(InvalidPort);
        state=82;
        flush();
        break;

case 82:        // Wait for key
```

3-5

APPENDIX 3

```
                            if( inqcnt3 )
                                    {
                                    sysop_menu();
                                    state=80;
                                    flush();
                                    }
                            break;

default:
                            break;
                    }
            if( chkkbd() )
                    done = 1;
            } comrest();
    comrest2();
    comrest3();
    exit(0);

}

/******** Get a Command line from terminal *************/
GetCommand()
{
int temp;
temp = 0;
if ( inqcnt3 )
   {
   temp = getcom3() & 0x7F;    /* mask out parity */
   command[rxptr] = temp;
   if ( (temp == 0x08) && (rxptr != 0) )
      {
      cputc3(0x08);
      cputc3(' ');
      cputc3(0x08);
      rxptr--;
      }
   if (temp != 0x08)
      {
      cputc3(temp);
      rxptr++;
      }
   }
```

3-6

APPENDIX 3

```c
if (temp == 0x0D )   /* wait for CR */
  {
       rxptr--;
   command[rxptr] = 0;
   rxptr = 0;
   return(1);
   }
return(0);
}

/******** Get a Password from terminal ******/
GetPassword()
{
int temp;
temp = 0;
if ( inqcnt3 )
   {
   temp = getcom3() & 0x7F;    /* mask out parity */
   command[rxptr] = temp;
   if ( (temp == 0x08) && (rxptr != 0) )
      {
      cputc3(0x08);
      cputc3(' ');
      cputc3(0x08);
      rxptr--;
      }
   if (temp != 0x08)
      {
      cputc3('*');
      rxptr++;
      }
   }
if (temp == 0x0D )   /* wait for CR */
      {
      rxptr--;
      command[rxptr] = 0;
      rxptr = 0;
      return(1);
      }
if (rxptr > 20 )    /* don't let too many chars */
      {
      rxptr--;
      command[rxptr] = 0;
      rxptr = 0;
      return(1);
```

3-7

APPENDIX 3

```
        }
return(0);
} wait(unsigned long l)
{
            timer(wticks);
            while( elapsed1000(wticks) < l )
                    ;
}
```

APPENDIX 4

```c
// ********* bsubs.c - basic utilites ********** include <stdlib.h>
include <stdio.h> include "externs.h"
include "defs.h"
include "af.h"                    // externs for asm stuff /* Quick and dumb terminal for the modem */
modem_terminal()
{
unsigned int itemp;
unsigned int j;

itemp = 0;
tcolor = 0x07;
cls(0);
jprintf("       BB Modem Terminal \n\r\n\rCOM2:9600,8,N,1\n\r");

jprintf("F1 = Clear screen\n\r");
jprintf("Hit Esc to exit terminal emulation\n\r\n\r");
while( itemp != 27 )
        {
        if ( inqcnt )
                {
                j = getcom();
                cput( j );
                } if( chkkbd() )
                {
                itemp = fgetkey();

if( itemp == 0x013b )
                        {
                        cls(0);
                        curx = 0;
                        cury = 0;
                        }
//              if( itemp == 0x013c )
//                      tdtr();
//              if( itemp == 0x013d )
//                      cputstr("AT&$\n\r");
//              if( itemp == 0x013e )
```

4-1

APPENDIX 4

```
//                    cputstr("ATDT 9686384\n\r");
//            if( itemp == 0x013f )
//                    cputstr("AT&V0\n\r");
//            if( itemp == 0x0140 )
//                    cputstr("AT&N17\n\r");

if( itemp != 27 )
                      {
                      cputc( itemp );
                      // cput( itemp );      // echo on
                      }
              }
        }
cls(0);
} void sputc3( unsigned char *s1 )
        {
        while( *s1 )
                {
                while( !chkcom3() )   // wait for clear to send
                        ;

cputc3(*s1++);
                }
        }
user_menu()
{
        sputc3(Home);
        sputc3("User Menu\n\r\n\r");
        sputc3("1 Read Meter\n\r");
        sputc3("2 Log off\n\r");
        sputc3("\n\rEnter command -> ");
} super_menu()
{
        sputc3(Home);
        sputc3("Supervisor Menu\n\r\n\r");
        sputc3("1 Read Meter\n\r");
        sputc3("2 Enter New Apartement\n\r");
        sputc3("3 Log off\n\r");
        sputc3("\n\rEnter command -> ");
```

4-2

APPENDIX 4

```
} sysop_menu()
{
        sputc3(Home);
        sputc3("Sysop Menu\n\r\n\r");
        sputc3("1 Read Meter\n\r");
        sputc3("q Log off\n\r");
        sputc3("\n\rEnter command -> ");
} flush()
{
        memset( command, 0, sizeof(command) );

while( inqcnt3 )
                getcom3();
}
```

4-3

What is claimed is:

1. A water reading data transmission system for communicating meter reading information for a group of meters, comprising:

one set of meter reading transmitter/node means coupled to the meters for sending wireless meter reading messages periodically, wherein said meter reading messages include the meter reading information for each one of said plurality of meters;

conductors means;

said one set of meter reading transmitter/node means including a meter reading transmitter unit connected electrically to a plurality of the meters in the group by said conductor means to enable said meter reading transmitter unit to receive the meter reading information for each one of the plurality of meters;

another set of meter reading transmitter/node means for receiving and re-transmitting said messages;

a remotely located data collection station for receiving the re-transmitted messages to enable the meters to be monitored;

said meter reading transmitter unit including processing means for detecting the occurrence of a predetermined event to enable said meter reading messages to be transmitted to said data collection station, wherein said meter reading messages are transmitted by said one set of meter reading transmitter/node means and received by said remotely located data collection station when the occurrence of said predetermined event is detected by said processing means;

wherein said processing means includes counter means for accumulating the meter reading information, and said meter reading transmitter unit further including a transmitter responsive to said processing means for sending the accumulated meter reading information as the meter reading messages;

wherein said one set of meter reading transmitter/node means further includes a node unit having a receiver for receiving the meter reading messages, and a transmitter responsive to the receipt of the messages for re-transmitting them to relay them toward the data collection station;

wherein said node unit includes another processing means for adding a receiving node identity signal to the meter reading messages to enable a receiving node unit to identify meter reading messages intended to be received by said receiving node unit, and for adding a sending node identity signal to the meter reading messages to enable said receiving node unit to determine the identity of the node unit sending the meter reading messages;

wherein said another processing means causes only those received messages having a higher node identity number to be retransmitted, as well as any messages received from meter reading transmitter units; and wherein the another processing means stores the identity of the lowest node identity number of a node unit transmitting a test message during an initialization mode of operation.

2. A meter reading transmission system according to claim 1, wherein the another processing means causes the messages to be re-transmitted until a node acknowledgment signal indicating message received.

3. A meter reading transmission system according to claim 1, further including a test signal generating mans for actuating said meter reading transmitter/node means to send repeatedly test messages to be received by node units during the initialization mode of operation so that the node units can determined the lowest node identity number received.

4. A meter reading transmission system according to claim 1 wherein said one set of meter reading transmitter/node means sends the messages repeatedly for a predetermined period of time and then terminates the sending.

5. A meter reading transmission system according to claim 4, wherein the processing means resets said counter means at the termination of the sending.

6. A water reading data transmission system according to claim 1, wherein said another set of meter reading transmitter/node means includes a higher order node for receiving the accumulated meter reading information from said one set of meter reading transmitter/node means and retransmitting the accumulated meter reading information, and further including a lower order node for receiving the retransmitted accumulated meter reading information from the higher order node and retransmitting the accumulated meter reading information to said data collection station.

7. A system according to claim 6, wherein said another set of meter reading transmitter/node means is arranged in a hierarchy to facilitate the transmission of the accumulated meter reading information for said individual one of the meter according to a specified route.

8. A method of communicating a meter reading information for a group of meters, comprising:

sending wireless meter reading messages periodically utilizing one set of meter reading transmitter/node means including a meter reading transmitter unit coupled to the meters;

connecting electrically said meter reading transmitter unit to a plurality of the meters in the group by conductor means to enable said meter reading transmitter unit to receive the meter reading information for each one of the plurality of meters;

receiving and re-transmitting said messages wirelessly utilizing another set of meter reading transmitter/node means;

receiving the re-transmitted messages to enable the meters to be monitored utilizing a remotely located data collection station;

detecting the occurrence of a predetermined event to enable said meter reading messages to be transmitted to said data collection station, wherein said meter reading messages are transmitted by said one set of meter reading transmitter/node means and received by said remotely located data collection station when the occurrence of said predetermined event is detected by said processing means;

adding a receiving node means identity signal to the meter reading messages to enable a receiving node means to identify its messages intended to be received by it, and adding its own receiving node means identity signal to the meter reading messages to enable a receiving node means to determine the identity of a sending node means;

re-transmitting only those received messages having a higher node means identity number; and storing the identity of the lowest node identity number of a node means transmitting a set message during an initialization mode of operation.

9. A method according to claim 8, further including accumulating said meter reading information for sending.

10. A method according to claim 8, further including repeatedly sending messages for a predetermined period of time and then terminating the sending.

11. A method according to claim 8, further including re-transmitting messages until its node means receives a node means acknowledgment signal indicating message received.

12. A method according to claim 8, further including sending repeatedly test messages to be received by other node means during he initialization mode of operation so that the node means can determine the lowest node means identity number received.

13. A method according to claim 8, further including:
  accumulating continuously the meter reading information as accumulated meter reading information;
  detecting when said accumulated meter reading information corresponds substantially to a transmission count to facilitate the transmission of the accumulated meter reading information in response thereto; and
  transmitting the accumulated meter reading information for the individual one of the meters when the accumulated meter reading information is transmitted from said transmitter means to said data collection station when said event is detected.

14. A system according to claim 13, further including receiving the transmitted accumulated meter reading information and retransmitting the received transmitted accumulated meter reading information to said data collection station.

15. A system according to claim 14, further including transmitting the accumulated meter reading information for said individual one of the meters according to a hierarchy.

16. A system according to claim 14, further including receiving the accumulated meter reading information from said transmitter means and retransmitting the accumulated meter reading information, and further including further receiving the retransmitted accumulated meter reading information and further retransmitting the accumulated meter reading information.

* * * * *